United States Patent
Sakai

(10) Patent No.: US 6,560,662 B1
(45) Date of Patent: May 6, 2003

(54) TIME-OUT PROCESSING METHOD AND APPARATUS FOR SCSI SYSTEM AS WELL AS RECORDING MEDIUM ON WHICH PROGRAM IS RECORDED

(75) Inventor: Tomohiro Sakai, Tokyo (JP)

(73) Assignee: NEC Corporation, Tokyo (JP)

( * ) Notice: Subject to any disclaimer, the term of this patent is extended or adjusted under 35 U.S.C. 154(b) by 477 days.

(21) Appl. No.: 09/609,287

(22) Filed: Jun. 30, 2000

(30) Foreign Application Priority Data

Jun. 30, 1999 (JP) ............................................ 11-184964

(51) Int. Cl.<sup>7</sup> ............................................... G06F 13/00
(52) U.S. Cl. ........................ 710/104; 710/105; 710/107; 713/1; 713/400; 713/500; 713/600
(58) Field of Search ................................. 710/104, 105, 710/107; 713/1, 400, 500, 600

(56) References Cited

U.S. PATENT DOCUMENTS 5,600,445 A * 2/1997 Omi ............................ 358/296
6,145,052 A * 11/2000 Howe et al. ................. 711/112
6,256,695 B1 * 7/2001 Williams ..................... 710/107

FOREIGN PATENT DOCUMENTS

JP 3-293856 12/1991

* cited by examiner

Primary Examiner—Rupal Dharia
(74) Attorney, Agent, or Firm—McGinn & Gibb, PLLC

(57) ABSTRACT

The invention provides a time-out processing method and apparatus for a SCSI system by which an appropriate time-out time for each initiator can be set in a target without the necessity for considerable re-construction of the system and without imposing a burden to a system manager. A disk processing apparatus incorporated in a SCSI system which includes the time-out processing apparatus and serving as a target fetches, when it starts data transfer to and from a host computer serving as an initiator, a data transfer starting time from a clock. If the numbers of REQ and ACK signals become incoincident from each other because of noise or the like during the data transfer, then the host computer issues a SCSI bus reset. The disk processing apparatus updates the time-out time for the host computer stored in a time-out time storage section based on a time after the data transfer is started until the SCSI bus reset is received.

5 Claims, 4 Drawing Sheets

FIG.2

| IDENTIFIER | TIME-OUT TIME |
|---|---|
| ID1 | T1 |
| ID2 | T2 |
| ⋮ | ⋮ |
| IDn | Tn |

TIME-OUT PROCESSING METHOD AND APPARATUS FOR SCSI SYSTEM AS WELL AS RECORDING MEDIUM ON WHICH PROGRAM IS RECORDED

BACKGROUND OF THE INVENTION

1. Field of the Invention

The present invention relates to a time-out processing apparatus and method for a SCSI system wherein a target and a plurality of initiators are connected to each other by a SCSI bus, and more particularly to a time-out processing apparatus and method wherein a time-out time for each initiator stored in a target is updated.

2. Description of the Related Art

Data transfer of an interface according to the SCSI standards is performed making use of a REQ (Request) signal and an ACK (Acknowledge) signal as control signals. In particular, an initiator responds with an ACK signal to a transfer request in the form of a REQ signal from a target (this is called REQ/ACK handshake) to perform data transfer. Data transfer is performed in one of an asynchronous mode and a synchronous mode which are different in a method of signaling a REQ signal and responding with an ACK signal. Whichever one of the asynchronous mode and the synchronous mode is used for transfer, an initiator responds to REQ signals signaled from a target with an equal number of ACT signals.

If the numbers of REQ signals and ACK signals become incoincident with each other because of noise to a SCSI bus or some other cause while data transfer is proceeding between a certain initiator and a target during data transfer over the REQ/ACK handshake, then the data transfer is not completed. Consequently, the other initiators cannot perform data transfer with the target.

In order to prevent occurrence of such a situation as just described, it is a popular practice to provide an initiator and a target with a function of determining that, when REQ/ACK handshake is not completed in a certain time, this is a time-out of the data transfer and releasing the bus. Here, two cases are available including a case wherein the initiator detects a time-out earlier than the target and issues a SCSI bus reset to release the bus and another case wherein the target detects a time-out earlier than the initiator and enters a bus-free phase to release the bus. Where operation in a multi-initiator environment wherein a plurality of initiators are connected is taken into consideration, since the transition into a bus-free phase by the target has a narrower range of influence than the resetting of the SCSI bus which cancels all commands and has an influence on the entire system, generally the time-out time of the target should be set shorter than the time-out times of the initiators so that the target may detect a time-out earlier than the initiators.

Here, the time-out time of each initiator is determined taking, for example, a data transfer rate of the initiator, a maximum size of transfer data and some other suitable parameters and is longer by several seconds than transfer time required for data of the maximum data size. In particular, if the time-out time is set shorter than the transfer time of maximum size data, then there is the possibility that the bus may be released while data transfer is proceeding normally. On the contrary, if the time-out time is set excessively long, then such a situation occurs that the bus is not released for a long time although data transfer fails because of noise or from some other cause. It is to be noted that, if the time-out time of the target is set shorter so that the bus may be released by the target before the initiator detects its time-out, then the initiator need not issue a SCSI bus reset (because the fact that the bus is released signifies that data transfer has come to an end irregularly).

Usually, a target has a fixed time-out time. Therefore, if the set time-out time is excessively short, then irregular ending occurs frequently, but if the set time-out time is excessively long, then a bus reset by an initiator occurs. In order to solve the problem just described, it is a possible method that a system manager sets the time-out time by a manual operation. This method, however, is disadvantageous in that the burden to the system manager is heavy.

Meanwhile, Japanese Patent Laid-Open No. 293856/1991 discloses an apparatus wherein each initiator issues a time-out setting command to a target and the target sets time-out times for the individual initiators. With the apparatus, the time-out times of the initiators can be set in the target without a burden to a system manager.

The apparatus disclosed in the document mentioned above, however, is disadvantageous in that, since it is necessary to provide all initiators connected to a SCSI bus with a function of issuing a time-out time setting command which is a novel command, considerable re-construction of the system is required. Further, depending upon a computer employed for an initiator, such re-construction may possibly be impossible.

SUMMARY OF THE INVENTION

It is an object of the present invention to provide a time-out processing method and apparatus for a SCSI system by which an appropriate time-out time for each initiator can be set in a target without the necessity for considerable re-construction of the system and without imposing a burden to a system manager.

In order to attain the object described above, according to an aspect of the present invention, there is provided a time-out processing method for a SCSI system wherein, when an elapsed time after a target, which is connected to a plurality of initiators by a SCSI bus and has a time-out time storage section for storing time-out times individually for the initiators, starts data transfer with any of the initiators exceeds the time-out time for the initiator stored in the time-out time storage section before the data transfer is completed, the target performs time-out processing to release the SCSI bus, comprising a step performed by the target of updating, when a SCSI bus reset is received from any of the initiators before data transfer with the initiator is completed after the data transfer is started, the time-out time for the initiator stored in the time-out time storage section based on an elapsed time before the SCSI bus reset is received after the data transfer is started, a processing time required for the time-out processing and a time estimated to require for the initiator to issue a SCSI bus reset after the initiator detects its time-out.

According to another aspect of the present invention, there is provided a time-out processing method for a SCSI system wherein, when an elapsed time after a target, which is connected to a plurality of initiators by a SCSI bus and has a time-out time storage section for storing time-out times individually for the initiators, starts data transfer with any of the initiators exceeds the time-out time for the initiator stored in the time-out time storage section before the data transfer is completed, the target performs time-out processing to release the SCSI bus, comprising a data transfer starting time fetching step performed by the target of fetching a data transfer stating time at which data transfer with any of the initiators is started, an elapsed time calculation step of calculating an elapsed time after the data transfer is started based on the data transfer starting time fetched in the data transfer starting time fetching step and a current time, and a time-out time updating step of updating, when a SCSI bus reset is received from the initiator before the data transfer is completed after the data transfer with the initiator is started, the time-out time for the initiator stored in the time-out time storage section based on the elapsed time calculated in the elapsed time calculation step, a processing time required for the time-out processing and a time estimated to require for the initiator to issue a SCSI bus reset after the initiator detects its time-out.

According to a further aspect of the present invention, there is provided a time-out processing apparatus for a SCSI system wherein, when an elapsed time after a target, which is connected to a plurality of initiators by a SCSI bus and has a time-out time storage section for storing time-out times individually for the initiators, starts data transfer with any of the initiators exceeds the time-out time for the initiator stored in the time-out time storage section before the data transfer is completed, the target performs time-out processing to release the SCSI bus, comprising time-out time updating means provided in the target for updating, when a SCSI bus reset is received from any of the initiators before data transfer with the initiator is completed after the data transfer is started, the time-out time for the initiator stored in the time-out time storage section based on an elapsed time before the SCSI bus reset is received after the data transfer is started, a processing time required for the time-out processing and a time estimated to require for the initiator to issue a SCSI bus reset after the initiator detects its time-out.

According to a still further aspect of the present invention, there is provided a time-out processing apparatus for a SCSI system wherein, when an elapsed time after a target, which is connected to a plurality of initiators by a SCSI bus and has a time-out time storage section for storing time-out times individually for the initiators, starts data transfer with any of the initiators exceeds the time-out time for the initiator stored in the time-out time storage section before the data transfer is completed, the target performs time-out processing to release the SCSI bus, comprising data transfer starting time fetching means provided in the target for fetching a data transfer stating time at which data transfer with any of the initiators is started, elapsed time calculation means provided in the target for calculating an elapsed time after the data transfer is started based on the data transfer starting time fetched by the data transfer starting time fetching means and a current time, and time-out time updating means provided in the target for updating, when a SCSI bus reset is received from the initiator before the data transfer is completed after the data transfer with the initiator is started, the time-out time for the initiator stored in the time-out time storage section based on the elapsed time calculated by the elapsed time calculation means, a processing time required for the time-out processing and a time estimated to require for the initiator to issue a SCSI bus reset after the initiator detects its time-out.

In the time-out processing apparatus just described, data transfer starting time fetching means fetches a data transfer stating time at which data transfer with any of the initiators is started, and the elapsed time calculation means calculates an elapsed time after the data transfer is started based on the data transfer starting time fetched by the data transfer starting time fetching means and a current time. Then, the time-out time updating means updates, when a SCSI bus reset is received from the initiator before the data transfer is completed after the data transfer with the initiator is started, the time-out time for the initiator stored in the time-out time storage section based on the elapsed time calculated by the elapsed time calculation means, a processing time required for the time-out processing and a time estimated to require for the initiator to issue a SCSI bus reset after the initiator detects its time-out.

According to a yet further aspect of the present invention, there is provided a recording medium which has recorded thereon a program which causes a target, which has a time-out time storage section for storing time-out times individually for a plurality of initiators connected thereto by a SCSI bus and performs, when an elapsed time after the target starts data transfer with any of the initiators exceeds the time-out time for the initiator stored in the time-out time storage section before the data transfer is completed, time-out processing to release the SCSI bus, to have functions as data transfer starting time fetching means provided in the target for fetching a data transfer stating time at which data transfer with any of the initiators is started, elapsed time calculation means provided in the target for calculating an elapsed time after the data transfer is started based on the data transfer starting time fetched by the data transfer starting time fetching means and a current time, and time-out time updating means provided in the target for updating, when a SCSI bus reset is received from the initiator before the data transfer is completed after the data transfer with the initiator is started, the time-out time for the initiator stored in the time-out time storage section based on the elapsed time calculated by the elapsed time calculation means, a processing time required for the time-out processing and a time estimated to require for the initiator to issue a SCSI bus reset after the initiator detects its time-out.

With the time-out processing methods and apparatus and the recording medium, the time-out time for each of the initiators is set in the target making use of such a function of issuing a SCSI bus reset when a time-out occurs as is usually provided in an initiator. Consequently, an appropriate time-out time for each initiator can be automatically set in the target without the necessity for considerable re-construction of the system such as re-construction of all initiators and without imposing a burden to a system manager.

The above and other objects, features and advantages of the present invention will become apparent from the following description and the appended claims, taken in conjunction with the accompanying drawings in which like parts or elements are denoted by like reference symbols.

BRIEF DESCRIPTION OF THE DRAWINGS

FIG. 2 is a table illustrating an example of contents of a time-out time storage section of a disk processing apparatus shown in FIG. 1;

DESCRIPTION OF THE PREFERRED EMBODIMENT

Figure 1:
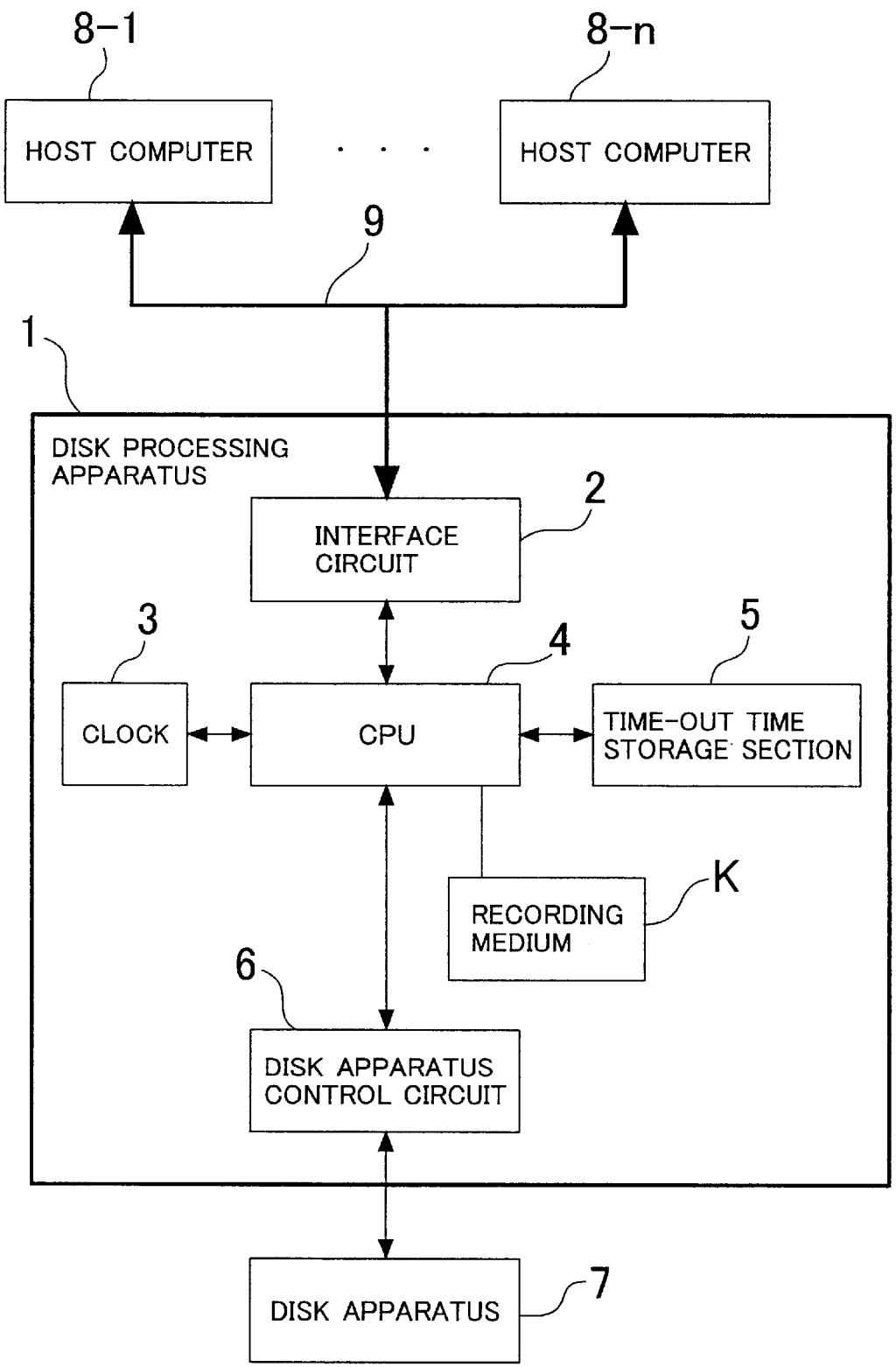
FIG. 1 is a block diagram of a SCSI system in which a time-out processing apparatus according to the present invention is incorporated.

Referring first to FIG. 1, there is shown a SCSI system in which a time-out processing apparatus according to the present invention is applied. The SCSI system shown includes a disk processing apparatus 1 serving as a target and controls a disk apparatus 7. A SCSI bus 9 connects the disk processing apparatus 1 to a plurality of host computers 8-1 to 8-n each serving as an initiator. The host computers 8-1 to 8-n have identifiers ID1 to IDn applied thereto, respectively.

The disk processing apparatus 1 includes an interface circuit 2 for controlling interfacing with the host computers 8-1 to 8-n, a clock 3 for managing the time, a CPU 4, a time-out time storage section 5, a disk apparatus control circuit 6 for inputting and outputting data from and to the disk apparatus 7, and a recording medium K.

The time-out time storage section 5 holds time-out times for the host computers 8-1 to 8-n in a corresponding relationship to the identifiers ID1 to IDn, respectively. FIG. 2 illustrates an example of contents of the time-out time storage section 5. From FIG. 2, it can be seen that the time-out times of the host computers 8-1 to 8-n to which the identifiers ID1 to IDn are applied are T1 to Tn, respectively. It is to be noted that, in an initial state, as initial values of the time-out times for the host computers 8-1 to 8-n, values higher than maximum values of the time-out times estimated to be set in the host computers 8-1 to 8-n are set in the time-out time storage section 5.

The CPU 4 has a function of performing data transfer to and from the host computers 8-1 to 8-n through the interface circuit 2, a function of inputting and outputting data from and to the disk apparatus 7 through the disk apparatus control circuit 6, and a function of updating the time-out times stored in the time-out time storage section 5.

Figure 3:
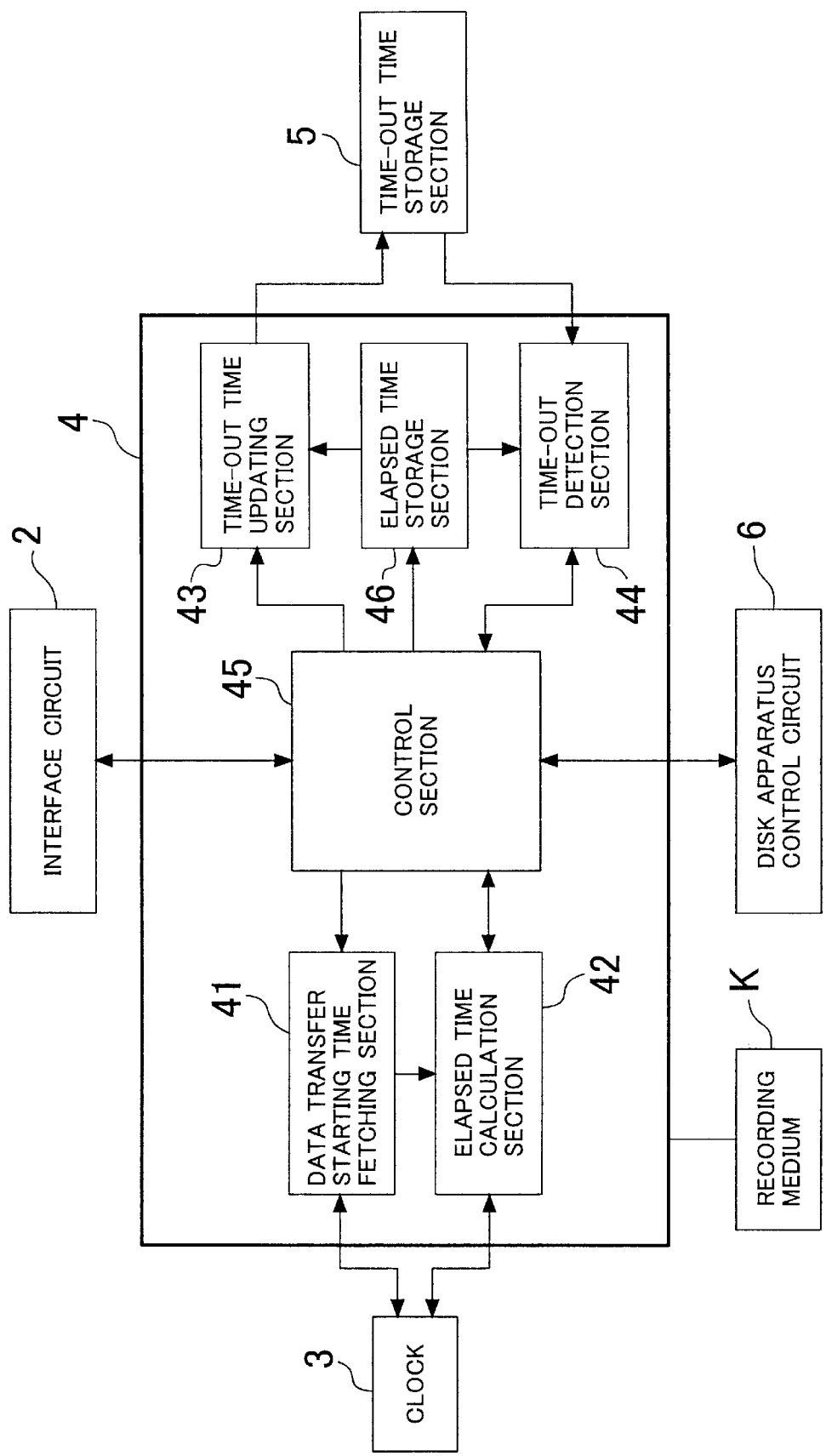
FIG. 3 is a block diagram showing an example of a construction of a CPU of the disk processing apparatus shown in FIG. 1.

FIG. 3 shows an example of a construction of the CPU 4. Referring to FIG. 3, the CPU 4 shown includes a data transfer starting time fetching section 41, an elapsed time calculation section 42, a time-out time updating section 43, a time-out detection section 44, a control section 45, and an elapsed time storage section 46.

The data transfer starting time fetching section 41 has a function of fetching a data transfer starting time from the clock 3 and storing it into the inside thereof in accordance with a fetching instruction applied thereto from the control section 45 at a time at which data transfer is to be started.

The elapsed time calculation section 42 has a function of determining, when an elapsed time calculation instruction is received from the control section 45, an elapsed time after data transfer is started based on the current time indicated by the clock 3 and the data transfer starting time stored in the data transfer starting time fetching section 41.

The time-out time updating section 43 has a function of updating the time-out times stored in the time-out time storage section 5 in accordance with an updating instruction from the control section 45.

The time-out detection section 44 discriminates, when a time-out detection instruction is received from the control section 45, whether or not a time-out has occur based on the elapsed time stored in the elapsed time storage section 46 and the time-out time of the host computer, which is currently transferring data, stored in the time-out time storage section 5, and notifying the control section 45 of a result of the discrimination.

The control section 45 has a function of performing data transfer to and from the host computers 8-1 to 8-n through the interface circuit 2, a function of inputting and outputting data to and from the disk apparatus 7 through the disk apparatus control circuit 6, a function of providing an elapsed time calculation instruction to the elapsed time calculation section 42, a function of providing, when a SCSI bus reset issued by any of the host computers 8-1 to 8-n is received, an updating instruction including the identifier of that of the host computers (the host computer which is currently transferring data) to the time-out time updating section 43, a function of providing a time-out detection instruction to the time-out detection section 44, a function of executing, when it is notified of a time-out from the time-out detection section 44, time-out processing to enter a bus-free phase to release the SCSI bus 9.

The recording medium K connected to the CPU 4 is a magnetic disk, an optical disk, a magneto-optical disk, a semiconductor memory or some other suitable recording medium and has a program stored therein for causing the CPU 4 to function as part of the time-out time updating apparatus. The program is read by the CPU 4 and controls operation of the CPU 4 so that the data transfer starting time fetching section 41, elapsed time calculation section 42, time-out time updating section 43, time-out detection section 44 and control section 45 may be implemented on the CPU 4.

Each of the host computers 8-1 to 8-n has a function of issuing a SCSI bus reset if data transfer is not completed even when the time-out time set therein elapses (even when a time-out is detected) after data transfer to the disk processing apparatus 1 is started. It is to be noted that each of the host computers 8-1 to 8-n has an appropriate time-out time set therein which has been determined taking the data transfer rate of the host computer and the maximum size of transfer data into consideration.

Now, operation of the SCSI system is described in detail.

If the control section 45 in the CPU 4 recognizes that a read command is received from a host computer 8-j ($1 \leq i \leq n$), then it controls the disk apparatus control circuit 6 to read out data from the disk apparatus 7 and transfers the read out data to the host computer 8-j through the interface circuit 2 over the SCSI bus 9. On the other hand, if the control section 45 recognizes that a write command is received from a host computer 8-j, then it writes data transferred thereto from the host computer 8-j over the SCSI bus 9 through the interface circuit 2 into the disk apparatus 7. Whether the command is a read command or a write command, the host computer 8-j responds with an ACK signal to a transfer request by a REQ signal from the control section 45 to transfer data, and at a point of time when the REQ/ACK handshake is repeated until a required number of data are transferred, the data transfer is completed.

Figure 4:
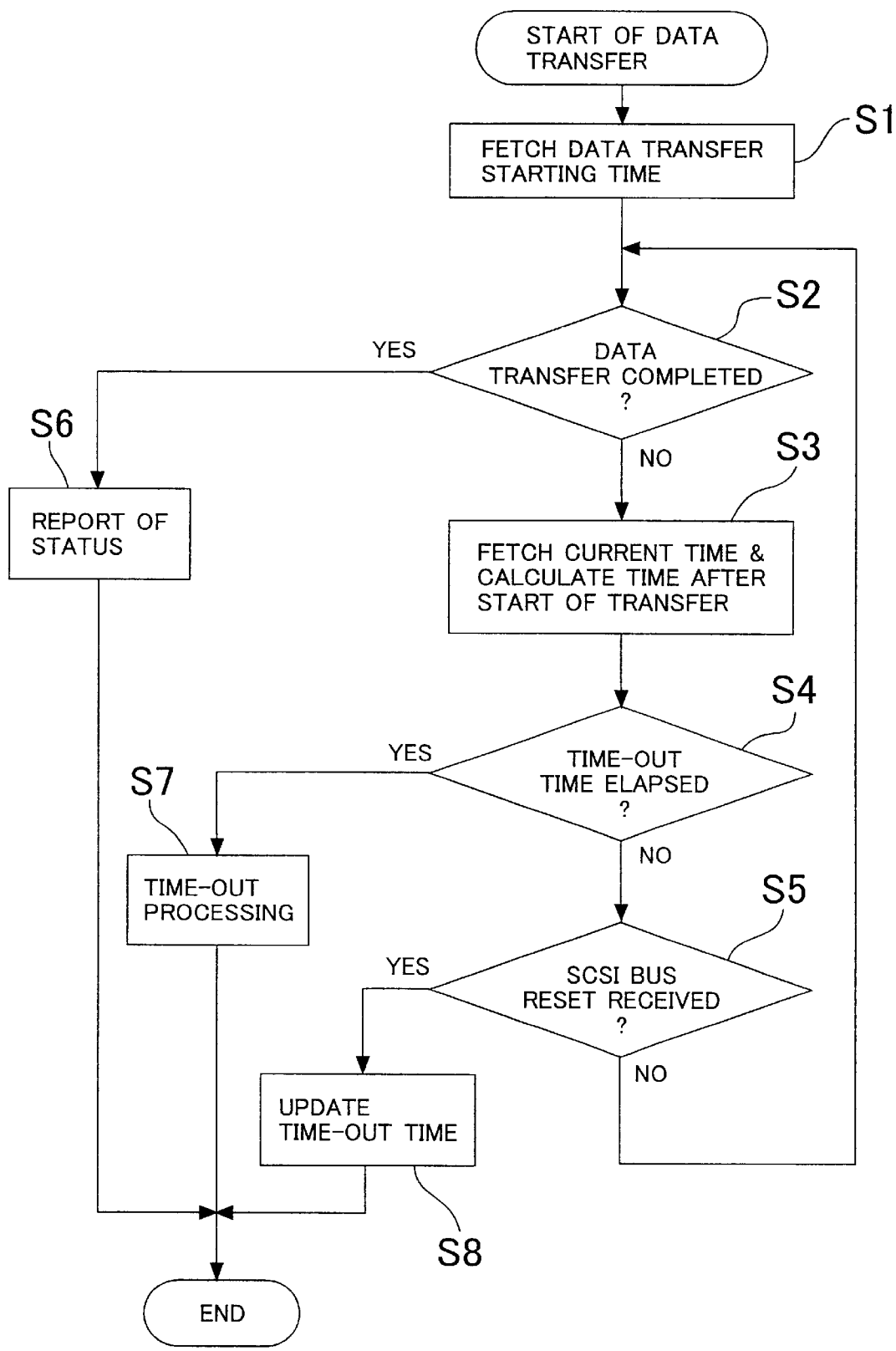
FIG. 4 is a flow chart illustrating an example of processing of a control section of the CPU of FIG. 3.

When the control section 45 in the CPU 4 transfers data in accordance with a read or write command sent thereto from the host computer 8-j, it further performs processing illustrated in a flow chart of FIG. 4 in addition to the data transfer processing by the REQ/ACT handshake.

Referring to FIG. 4, upon starting of data transfer, the control section 45 provides a time fetching instruction to the data transfer starting time fetching section 41 (step S1). Consequently, the data transfer starting time fetching section 41 fetches the current time from the clock 3 and stores the time as a data transfer starting time into the inside thereof.

Thereafter, the control section 45 enters a data transfer completion waiting state (a loop of steps S2→S3→S4→S5→S2).

In step S2 in which the control section 45 remains in the data transfer completion waiting state, it checks whether or not data transfer is completed. Then, if the data transfer is completed (YES in step S2), then the control section 45 sends a status report representing that the data transfer is completed normally to the host computer 8-j through the interface circuit 2 over the SCSI bus 9 (step S6). On the other hand, if the data transfer is not completed (NO in step S2), then the control section 45 executes processing in next step S3.

In step S3, the control section 45 provides an elapsed time calculation instruction to the elapsed time calculation section 42 and stores an elapsed time calculated by the elapsed time calculation section 42 into the elapsed time storage section 46. When the elapsed time calculation section 42 receives the elapsed time calculation instruction, it calculates an elapsed time after the data transfer to the host computer 8-j is started based on the current time indicated by the clock 3 and the data transfer starting time stored in the data transfer starting time fetching section 41, and passes the calculated elapsed time to the control section 45.

In step S4, the control section 45 provides a time-out detection instruction (including the identifier IDj of the host computer 8-j which is currently transferring data) to the time-out detection section 44 and then discriminates it based on a response from the time-out detection section 44 whether or not a time-out has occurred. Then, if the control section 45 discriminates that no time-out has occurred (NO in step S4), then it performs processing in step S5, but if the control section 45 discriminates that a time-out has occurred (YES in step S4), then the control section 45 performs time-out processing to enter a bus-free phase to release the SCSI bus 9 (step S7). When the time-out detection section 44 receives the time-out detection instruction, it checks whether or not the elapsed time stored in the elapsed time storage section 46 exceeds the time-out time of the host computer 8-j stored in the time-out time storage section 5. If the elapsed time exceeds the time-out time, then the time-out detection section 44 notifies the control section 45 of occurrence of a time-out, but if the elapsed time does not exceed the time-out time, then the time-out detection section 44 notifies the control section 45 that no time-out has occurred.

In next step S5, the control section 45 discriminates whether or not a SCSI bus reset issued by the host computer is received. If no SCSI bus reset is received (NO in step S5), then the control section 45 returns its processing to step S2. On the other hand, if the control section 45 receives a SCSI bus reset (YES in step S5), then it provides an updating instruction (including the identifier IDj of the host computer 8-j which is currently transferring data) to the time-out time updating section 43. Consequently, the time-out time updating section 43 updates the time-out time for the host computer 8-j stored in the time-out time storage section 5 based on the elapsed time stored in the elapsed time storage section 46. In particular, in such a case that the numbers of signaled REQ signals and received ACK signals recognized by the control section 45 become different from each other because of noise to the SCSI bus 9 or from some other cause, the time-out time for the host computer 8-j is updated so that the SCSI bus 9 may be released by the control section 45 a little before the host computer 8-j detects a time-out. More specifically, the time-out time is updated to a time obtained by subtracting the time required for processing in steps S4 and S6 and the time required to issue a SCSI bus reset after the host computer detects a time-out from the elapsed time stored in the elapsed time storage section 46.

For example, if the numbers of signaled REQ signals and received ACT signals recognized by the control section 45 become incoincident from each other because of noise to the SCSI bus 9 or from some other cause during data transfer to the host computer 8-j, then since the data transfer is not completed, the control section 45 remains in the data transfer completion waiting state (the loop of steps S2→S3→S4→S5→S2).

If this incoincidence occurs for the first time after the operation of the system is started while data transfer to the host computer 8-j is proceeding, then the control section 45 remains in the data transfer completion waiting state until it receives a SCSI reset issued from the host computer 8-j. This is because, at the point of time, an initial value is stored as a time-out time for the host computer 8-j in the time-out time storage section 5 and this value is greater than the time-out time in which the host computer 8-j issues a SCSI reset.

Then, if a SCSI bus reset is received (YES in step S5), then the control section 45 controls the time-out time updating section 43 to update the time-out time for the host computer 8-j stored in the time-out time storage section 5 to a value obtained by subtracting the time required for the processing in steps S4 and S7 and a time estimated to require for the host computer 8-j to issue a SCSI bus reset after the host computer detects its time-out from the elapsed time stored in the elapsed time storage section 46.

Thereafter, while the control section 45 is performing data transfer to and from the host computer 8-j, if the numbers of signaled REQ signals and received ACK signals recognized by the control section 45 become incoincident from each other because of noise to the SCSI bus 9 or from some other cause, then since the data transfer does not come to an end, the control section 45 remains in the data transfer completion waiting state (the loop of steps S2→S3→S4→S5→S2). At this point of time, the time-out time for the host computer 8-j stored in the time-out time storage section 5 is the value updated as described above. Consequently, the discrimination in step S4 becomes YES without fail before the discrimination in step S5 becomes YES, and the time-out processing in step S7 is performed. It is to be noted that, if the bus is released by the target, then the host computer 8-j discriminates that the data transfer is ended abnormally, and ends its data transfer processing.

While a preferred embodiment of the present invention has been described using specific terms, such description is for illustrative purposes only, and it is to be understood that changes and variations may be made without departing from the spirit or scope of the following claims.

What is claimed is:

1. A time-out processing method for a SCSI system wherein, when an elapsed time after a target, which is connected to a plurality of initiators by a SCSI bus and has a time-out time storage section for storing time-out times individually for said initiators, starts data transfer with any of said initiators exceeds the time-out time for the initiator stored in said time-out time storage section before the data transfer is completed, said target performs time-out processing to release said SCSI bus, comprising:

a step performed by said target of updating, when a SCSI bus reset is received from any of said initiators before data transfer with the initiator is completed after the data transfer is started, the time-out time for the initiator stored in said time-out time storage section based on an elapsed time before the SCSI bus reset is received after the data transfer is started, a processing time required for the time-out processing and a time estimated to require for the initiator to issue a SCSI bus reset after the initiator detects its time-out.

2. A time-out processing method for a SCSI system wherein, when an elapsed time after a target, which is connected to a plurality of initiators by a SCSI bus and has a time-out time storage section for storing time-out times individually for said initiators, starts data transfer with any of said initiators exceeds the time-out time for the initiator stored in said time-out time storage section before the data transfer is completed, said target performs time-out processing to release said SCSI bus, comprising:

a data transfer starting time fetching step performed by said target of fetching a data transfer stating time at which data transfer with any of said initiators is started;

an elapsed time calculation step of calculating an elapsed time after the data transfer is started based on the data transfer starting time fetched in the data transfer starting time fetching step and a current time; and a time-out time updating step of updating, when a SCSI bus reset is received from the initiator before the data transfer is completed after the data transfer with the initiator is started, the time-out time for the initiator stored in said time-out time storage section based on the elapsed time calculated in the elapsed time calculation step, a processing time required for the time-out processing and a time estimated to require for the initiator to issue a SCSI bus reset after the initiator detects its time-out.

3. A time-out processing apparatus for a SCSI system wherein, when an elapsed time after a target, which is connected to a plurality of initiators by a SCSI bus and has a time-out time storage section for storing time-out times individually for said initiators, starts data transfer with any of said initiators exceeds the time-out time for the initiator stored in said time-out time storage section before the data transfer is completed, said target performs time-out processing to release said SCSI bus, comprising:

time-out time updating means provided in said target for updating, when a SCSI bus reset is received from any of said initiators before data transfer with the initiator is completed after the data transfer is started, the time-out time for the initiator stored in said time-out time storage section based on an elapsed time before the SCSI bus reset is received after the data transfer is started, a processing time required for the time-out processing and a time estimated to require for the initiator to issue a SCSI bus reset after the initiator detects its time-out.

4. A time-out processing apparatus for a SCSI system wherein, when an elapsed time after a target, which is connected to a plurality of initiators by a SCSI bus and has a time-out time storage section for storing time-out times individually for said initiators, starts data transfer with any of said initiators exceeds the time-out time for the initiator stored in said time-out time storage section before the data transfer is completed, said target performs time-out processing to release said SCSI bus, comprising:

data transfer starting time fetching means provided in said target for fetching a data transfer stating time at which data transfer with any of said initiators is started;

elapsed time calculation means provided in said target for calculating an elapsed time after the data transfer is started based on the data transfer starting time fetched by said data transfer starting time fetching means and a current time; and time-out time updating means provided in said target for updating, when a SCSI bus reset is received from the initiator before the data transfer is completed after the data transfer with the initiator is started, the time-out time for the initiator stored in said time-out time storage section based on the elapsed time calculated by said elapsed time calculation means, a processing time required for the time-out processing and a time estimated to require for the initiator to issue a SCSI bus reset after the initiator detects its time-out.

5. A recording medium which has recorded thereon a program which causes a target, which has a time-out time storage section for storing time-out times individually for a plurality of initiators connected thereto by a SCSI bus and performs, when an elapsed time after said target starts data-transfer with any of said initiators exceeds the time-out time for the initiator stored in said time-out time storage section before the data transfer is completed, time-out processing to release said SCSI bus, to have functions as:

data transfer starting time fetching means provided in said target for fetching a data transfer stating time at which data transfer with any of said initiators is started;

elapsed time calculation means provided in said target for calculating an elapsed time after the data transfer is started based on the data transfer starting time fetched by said data transfer starting time fetching means and a current time; and time-out time updating means provided in said target for updating, when a SCSI bus reset is received from the initiator before the data transfer is completed after the data transfer with the initiator is started, the time-out time for the initiator stored in said time-out time storage section based on the elapsed time calculated by said elapsed time calculation means, a processing time required for the time-out processing and a time estimated to require for the initiator to issue a SCSI bus reset after the initiator detects its time-out.

\* \* \* \* \*